(12) United States Patent
Hart et al.

(10) Patent No.: US 7,970,347 B2
(45) Date of Patent: *Jun. 28, 2011

(54) COMMUNICATION SYSTEMS

(75) Inventors: Michael John Beems Hart, London (GB); Yuefeng Zhou, West Sussex (GB)

(73) Assignee: Fujitsu Limited, Kawasaki (JP)

( * ) Notice: Subject to any disclaimer, the term of this patent is extended or adjusted under 35 U.S.C. 154(b) by 799 days.

This patent is subject to a terminal disclaimer.

(21) Appl. No.: 11/840,546

(22) Filed: Aug. 17, 2007

(65) Prior Publication Data

US 2008/0043815 A1   Feb. 21, 2008

(30) Foreign Application Priority Data

Aug. 18, 2006   (GB) .................................. 0616481.8

(51) Int. Cl.
*H04B 7/15*   (2006.01)
(52) U.S. Cl. ..................... 455/13.1; 455/445; 455/452.1; 455/11.1; 370/315
(58) Field of Classification Search ............... 370/310.2, 370/314, 315, 320, 321, 328, 329, 330, 332, 370/341, 343, 338, 344, 347, 348, 203, 325; 455/414.1, 11.1, 450.1, 452.1, 552.1, 550.1
See application file for complete search history.

(56) References Cited

U.S. PATENT DOCUMENTS

| | | |
|---|---|---|
| 5,719,868 A | 2/1998 | Young |
| 6,370,384 B1 | 4/2002 | Komara |
| 6,701,129 B1 | 3/2004 | Hashem et al. |
| 7,085,284 B1 * | 8/2006 | Negus ............................ 370/461 |
| 7,096,274 B1 | 8/2006 | Ci et al. |
| 7,180,875 B1 * | 2/2007 | Neumiller et al. ............ 370/329 |
| 7,339,897 B2 * | 3/2008 | Larsson et al. ................ 370/252 |
| 2002/0080816 A1 | 6/2002 | Spinar et al. |

(Continued)

FOREIGN PATENT DOCUMENTS

EP   0 151 280   12/1984

(Continued)

OTHER PUBLICATIONS

Communication from the European Patent Office, European Search Report for Application No. EP 07 11 3538, Dec. 27, 2007, 7 pages.

(Continued)

*Primary Examiner* — Jean A Gelin
(74) *Attorney, Agent, or Firm* — Baker Botts L.L.P.

(57) ABSTRACT

A transmission method for use in a multi-hop wireless communication system is provided. Furthermore, the system has access to a time-frequency format for use in assigning available transmission frequency bandwidth during a discrete transmission interval. The format defines a plurality of transmission windows within such an interval, where each window occupies a different part of that interval and has a frequency bandwidth profile within the available transmission frequency bandwidth over its part of that interval. Furthermore, each window being assignable for such a transmission interval to one of said apparatuses for use in transmission. The transmission method for use in this system includes employing said format for one or more such transmission intervals to transmit data and control information together along at least two consecutive said links as a set of successive transmission signals, link by link. Each said signal is transmitted in an available transmission window of said interval(s) and at least two of said signals are transmitted during the same said transmission interval such that said information is transmitted along said consecutive links in fewer transmission intervals than said number of consecutive links.

26 Claims, 6 Drawing Sheets

U.S. PATENT DOCUMENTS

| | | | |
|---|---|---|---|
| 2003/0054771 | A1 | 3/2003 | Chappaz |
| 2004/0005861 | A1 | 1/2004 | Tauchi |
| 2004/0100929 | A1 | 5/2004 | Garcia-Luna-Aceves |
| 2004/0109428 | A1 | 6/2004 | Krishnamurthy |
| 2004/0116139 | A1* | 6/2004 | Yi et al. ............. 455/503 |
| 2005/0030887 | A1 | 2/2005 | Jacobsen et al. |
| 2005/0048914 | A1 | 3/2005 | Sartori et al. |
| 2006/0023745 | A1 | 2/2006 | Koo et al. |
| 2006/0256741 | A1 | 11/2006 | Nozaki |
| 2006/0264172 | A1 | 11/2006 | Izumikawa et al. |
| 2008/0095106 | A1* | 4/2008 | Malladi et al. ............ 370/329 |
| 2010/0048198 | A1* | 2/2010 | Lee et al. ............ 455/422.1 |

FOREIGN PATENT DOCUMENTS

| | | |
|---|---|---|
| EP | 1324509 | 7/2003 |
| EP | 1 617 693 | 1/2006 |
| EP | 1 635 592 | 3/2006 |
| EP | 1 677 443 | 7/2006 |
| EP | 1783966 | 5/2007 |
| EP | 1 804 430 A1 | 7/2007 |
| WO | WO 99/44341 | 9/1999 |
| WO | WO 01/76289 | 10/2001 |
| WO | WO 03/058984 | 7/2003 |
| WO | WO 2004/056013 | 7/2004 |
| WO | WO 2004/107693 | 12/2004 |
| WO | WO 2005/067173 | 7/2005 |
| WO | WO 2006/012554 | 2/2006 |
| WO | WO 2006/065069 | 6/2006 |
| WO | WO 2006/098608 | 9/2006 |
| WO | WO 2006/120161 | 11/2006 |

OTHER PUBLICATIONS

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™, " Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group < http://ieee802.org/16>, pp. 0-3.

Hart et al., "Frame Structure for Multihop Relaying Support," IEEE 802.16 Broadband Wireless Access Working Group < http://ieee802. org/16>, IEE C80216j/138, ieee 802.16 meeting #46, pp. 0-9.

Hart et al., >, "TDD MR Frame Structure," IEEE 802.16 Broadband Wireless Access Working Group < http://ieee802.org/16>, pp. 1-10.

Hart, "Dimensioning and System Level Analysis of an HSDPA Network with Relaying Nodes," 5 pages, 2005.

Chu, "Polyphase Codes with Good Periodic Correlation Properties," IEEE Transactions on Information Theory, Jul. 1972, pp. 531-532.

Frank et al., "Phase Shift Pulse Codes with Good Periodic Correlation Properties," IRE Transactions on Information Theory, pp. 381-382.

Milewski, "Periodic Sequences with Optimal Properties for Channel Estimation and Fast Start-Up Equalization," IBM Research and Development Journal, pp. 426-431.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82- 87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

Hart et al., "Communication Systems," Pending U.S. Appl. No. 11/856,178, filed Sep. 17, 2007.

Communication from the European Patent Office, European Search Report for Application No. EP 08 15 8421, Oct. 21, 2008, 1 page.

Communication from the European Patent Office, European Search Report for Application No. EP 07 11 3481, Oct. 19, 2007, 1 page.

Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.

Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

Etri et al, Transmission of IP Packets over Ethernet over IEEE 802.16, draft-riegel-16ng-ip-over-eth-over-80216-01.txt, Oct. 1, 2006, pp. 1-16.

Kim et al., Fair and Efficient Multihop Scheduling Algorithm for IEEE 802.16 BWA Systems, pp. 895-901, Oct. 3-7, 2005.

European Patent Office, European Search Report for Application No. EP 08 15 5435, Aug. 1, 2008, 8 pages.

European Patent Office, European Search Report for Application No. EP 07 11 3483, Sep. 26, 2007, 6 pages.

IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.

Hart et al., "Factors That Affect Performance of a Mobile Multihop Relay System," IEEE 802.16 Presentation Submission Template (Rev.8.3), Sep. 13, 2005, 19 pages.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

Extended European Search Report; Application No. 07113539.6; pp. 15, Jan. 25, 2011.

Extended European Search Report; Application No. 09173853.4; pp. 16, Jan. 25, 2011.

Levanda; "Stationary-Systems Based Relaying Part: Frame Structure"; IEEE 802.16; XP-002573795; pp. 18, May 4, 2006.

Ni et al.; "Cooperative Relay in IEEE 802.16j MMR"; IEEE 802.16; XP-002573794; pp. 10, Apr. 30, 2006.

Shen et al.; "Recommendations on IEEE 802.16j"; IEEE 802.16; XP-002573791; pp. 14, May 8, 2006.

Jo et al.; "Reduction of Latency in Mobile Multi-hop Relay(MMR) Netwroks"; Wireless Communications & Signal Processing, 2009; International Conference on, IEEE; pp. 5, 2009.

* cited by examiner

Frame Structure

Node activity within each zone

Example TDD frame structure from OFDMA physical layer of the IEEE802.16 standard

COMMUNICATION SYSTEMS

CROSS-REFERENCE TO RELATED APPLICATIONS

This application relates to the following applications, each of which is incorporated herein by reference:

COMMUNICATION SYSTEMS, application Ser. No. 11/840,492, filed Aug. 17, 2007 and currently pending;
COMMUNICATION SYSTEMS, application Ser. No. 11/840,518, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,595, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

RELATED APPLICATIONS

This application claims foreign priority benefits under 35 U.S.C. §119 of United Kingdom Application No. GB 0616481.8, filed on Aug. 18, 2006, entitled "Communication Systems".

TECHNICAL FIELD

This invention relates in general to communication systems, and more particularly to a frame structure for a multi-hop communication system.

OVERVIEW

Currently there exists interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 3 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIGS. 4a and 4b illustrate a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIGS. 4a and 4b is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIGS. 4a and 4b provide access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L = b + 10n \log d \quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI)+L(ID)<L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \quad 0 \leq t \leq T_s \quad (1)$$

where $\Delta f$ is the sub-carrier separation in Hz, $T_s = 1/\Delta f$ is symbol time interval in seconds, and $c_n$ are the modulated source signals. The sub-carrier vector in (1) onto which each of the source signals is modulated $c \in C_n$, $c = (c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode. As an example, FIG. 5 illustrates the single hop TDD frame structure used in the OFDMA physical layer mode of the IEEE 802.16 standard (WiMAX).

Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP.

The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a transmission method for use in a multi-hop wireless communication system is provided. The system includes a source apparatus, a destination apparatus and one or more intermediate apparatuses. The source apparatus is operable to transmit information along a series of links forming a communication path extending from the source apparatus to the destination apparatus via the intermediate apparatus. Each intermediate apparatus is operable to receive information from a previous apparatus along the path and to transmit the received information to a subsequent apparatus along the path. Furthermore, the system has access to a time-frequency format for use in assigning available transmission frequency bandwidth during a discrete transmission interval. The format defines a plurality of transmission windows within such an interval, where each window occupies a different part of that interval and has a frequency bandwidth profile within the available transmission frequency bandwidth over its part of that interval. Furthermore, each window being assignable for such a transmission interval to one of said apparatuses for use in transmission. The transmission method for use in this system includes employing said format for one or more such transmission intervals to transmit data and control information together along at least two consecutive said links as a set of successive transmission signals, link by link. Each said signal is transmitted in an available transmission window of said interval(s) and at least two of said signals are transmitted during the same said transmission interval such that said information is transmitted along said consecutive links in fewer transmission intervals than said number of consecutive links.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

When a node is required to support two independent links to two different nodes, e.g. a relay station communicating with a base station and a mobile, the existing TDD or FDD frame structures require some modification in order to make realization of the relay practical.

Particular embodiments provide a frame structure for a multihop communication system that is an extension of the standard TDD frame structure (see IEEE 802.16 standard for an example) that provides support for any number of hops in the system. The proposed frame structure has numerous benefits, as described later in this description.

The proposed frame structure makes the assumption that the MS cannot reliably receive the control information originating from the head node or that a network that incorporates relays that will perform some degree of local connection management and/or medium allocation management. This local management could be based on decisions being made at the RS independent of all other nodes in the communication system or network, or with some degree of co-operation between the various nodes that incorporate some control functionality. Further, it could be that whilst the RS has the capability to transmit control information, that all management decisions are made at a node other than the RS from which the signals are transmitted.

It is also assumed that the modified frame TDD structure should provide support for legacy mobile devices that have no knowledge of a relay station such that they can operate within the communication system or network.

Figure 1:
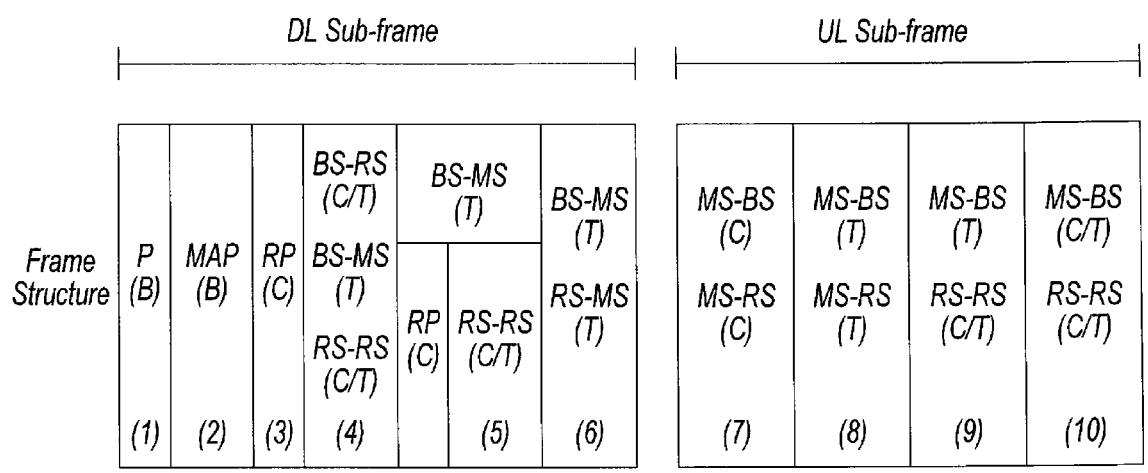
FIG. 1 shows a frame structure.

One proposed generic TDD frame structure is shown in FIG. 1. It is composed of a number of transmission and reception zones for both the downlink and uplink sub-frames. The zone types are either:

B Broadcast of control related information such as: synchronization sequences, commands, information and details of the structure or layout of the frame.
C Dedicated control information that is transmitted in a non-broadcast zone (i.e. either to individual or a group of receivers)
T Dedicated user-data transmission The 9 different zones are described in Table 1, below.

| Zone Number | Label | Description |
| --- | --- | --- |
| 1 | P | Preamble or synchronization sequence transmissions for cell identification |
| 2 | MAP | Frame format description (zone boundaries, allocations within the zones, etc) |
| 3 | RP | Relay preamble or synchronization transmission or reception zone. |
| 4 | BS-RS/BS-MS/RS-RS | BS to RS transmission zone & RS to RS transmission zone. Can also be used for BS to MS transmission if spatial division multiple access is supported (i.e. the same transmission resource can be used to communicate with more than one entity) |
| 5 | BS-MS/BS-RS/RP | BS to MS transmission zone & RS to RS transmission zone (including an RP zone as described in item (3) above). |
| 6 | BS-MS/RS-MS | RS to MS & BS to MS transmission zone (BS ideally transmits to MSs that will have limited impact from simultaneous RS transmission). |
| 7 | MS-BS/MS-RS | MS control information transmission zone to an RS or BS. Control information can be information or requests from the MS. |
| 8 | MS-BS/MS-RS | MS to RS & MS to BS transmission zone. |
| 9 | MS-BS/RS-RS | MS to BS & RS to RS transmission zone. |
| 10 | RS-BS/RS-RS | RS to BS & RS to RS transmission zone. Can also be used for MS to BS transmission if spatial division multiple access is supported (i.e. the same transmission resource can be used to communicate with more than one entity) |

Figure 2:
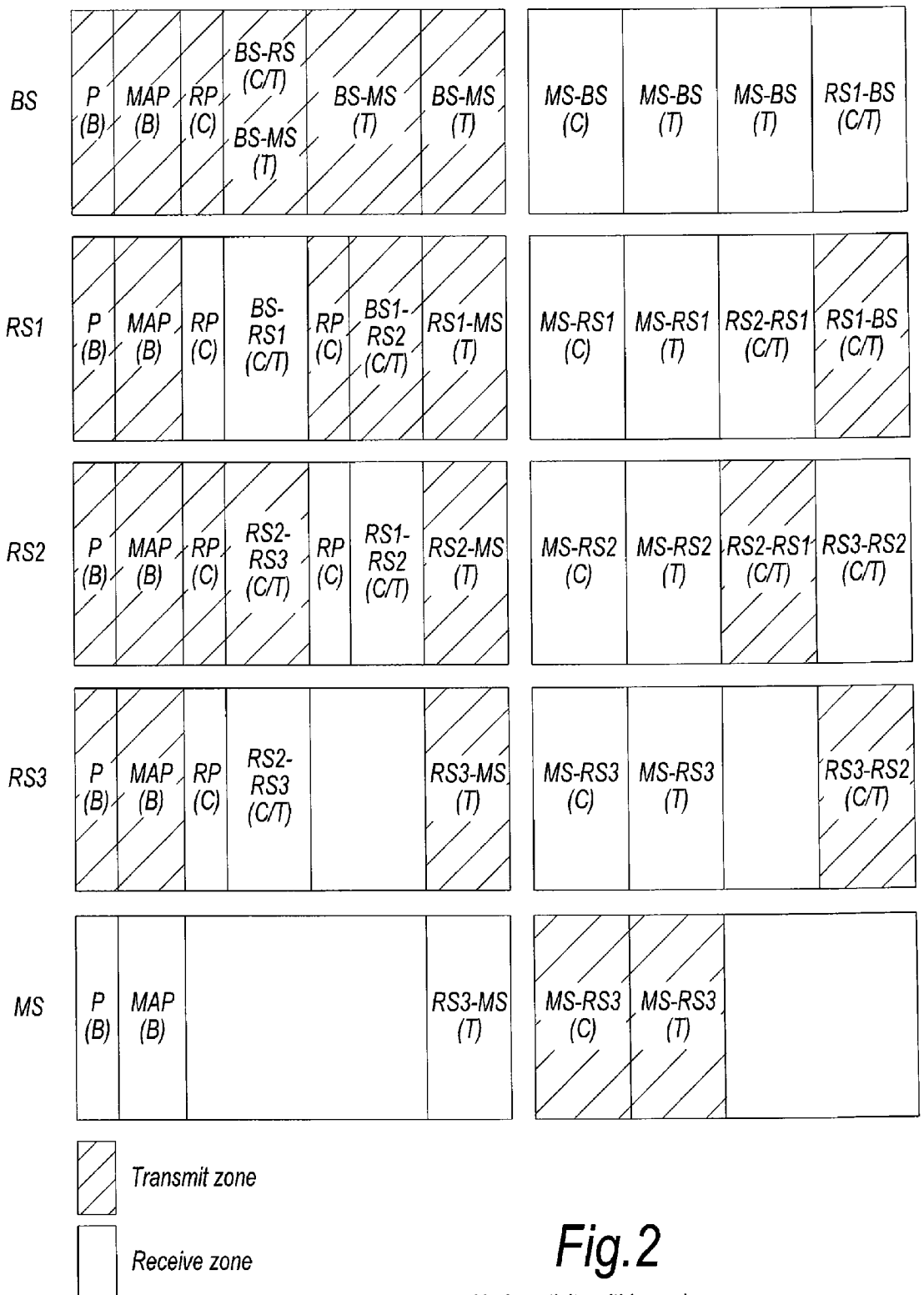
FIG. 2 shows node activity within each zone.
Figure 3:
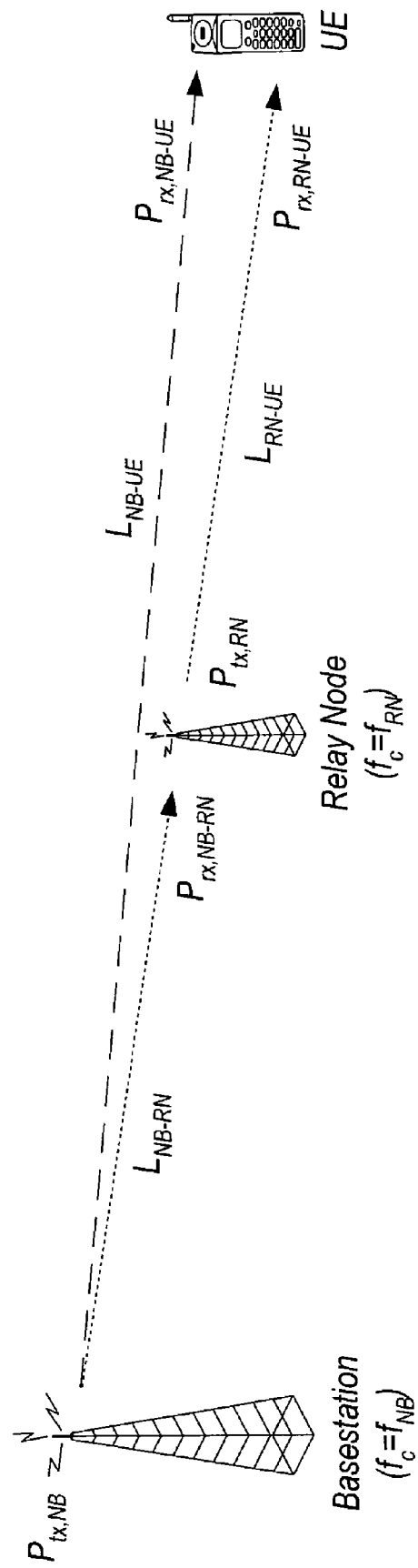
FIG. 3 shows a two-hop system.
Figure 4A:
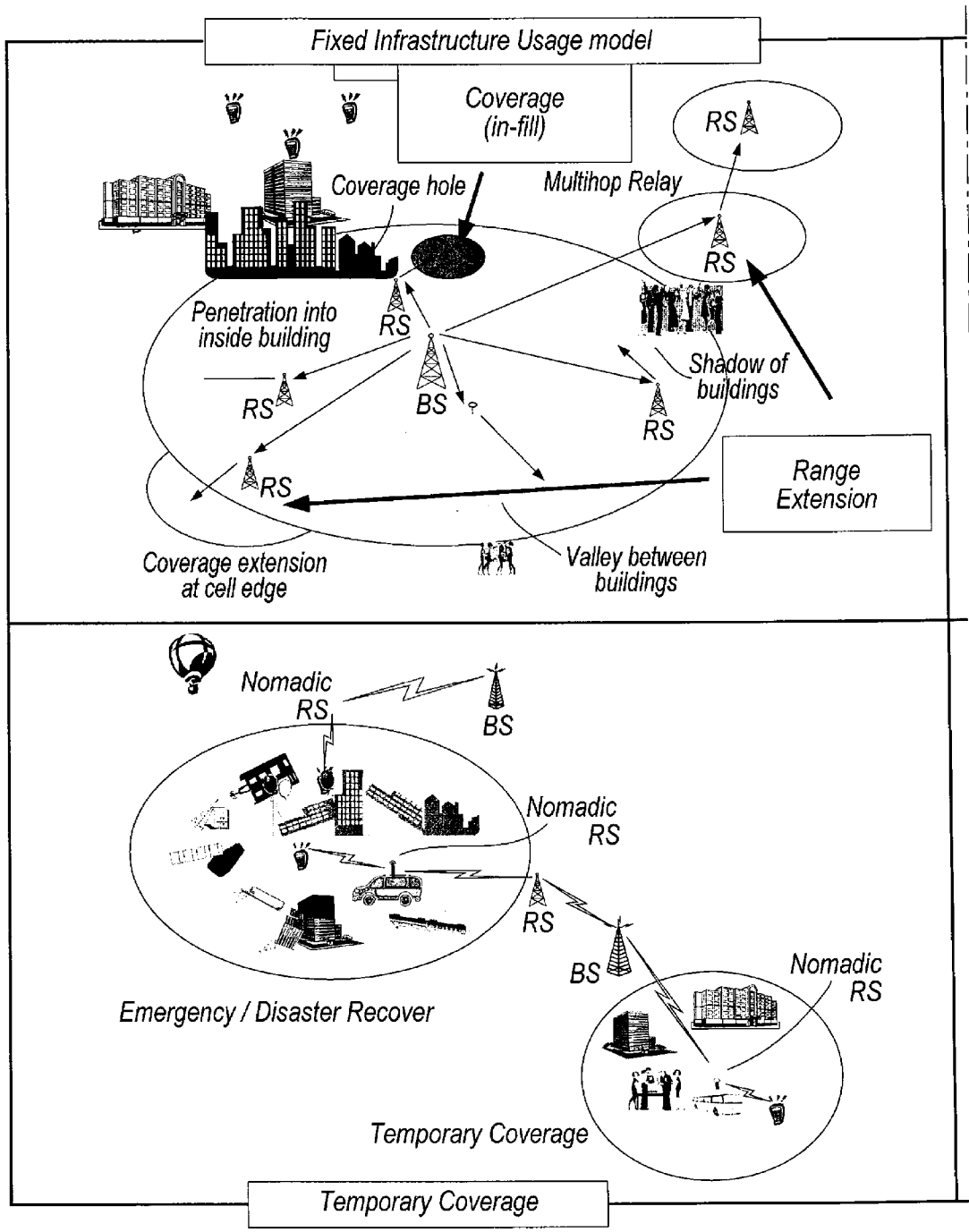
FIGS. 4a and 4b show applications of relaying.
Figure 4B:
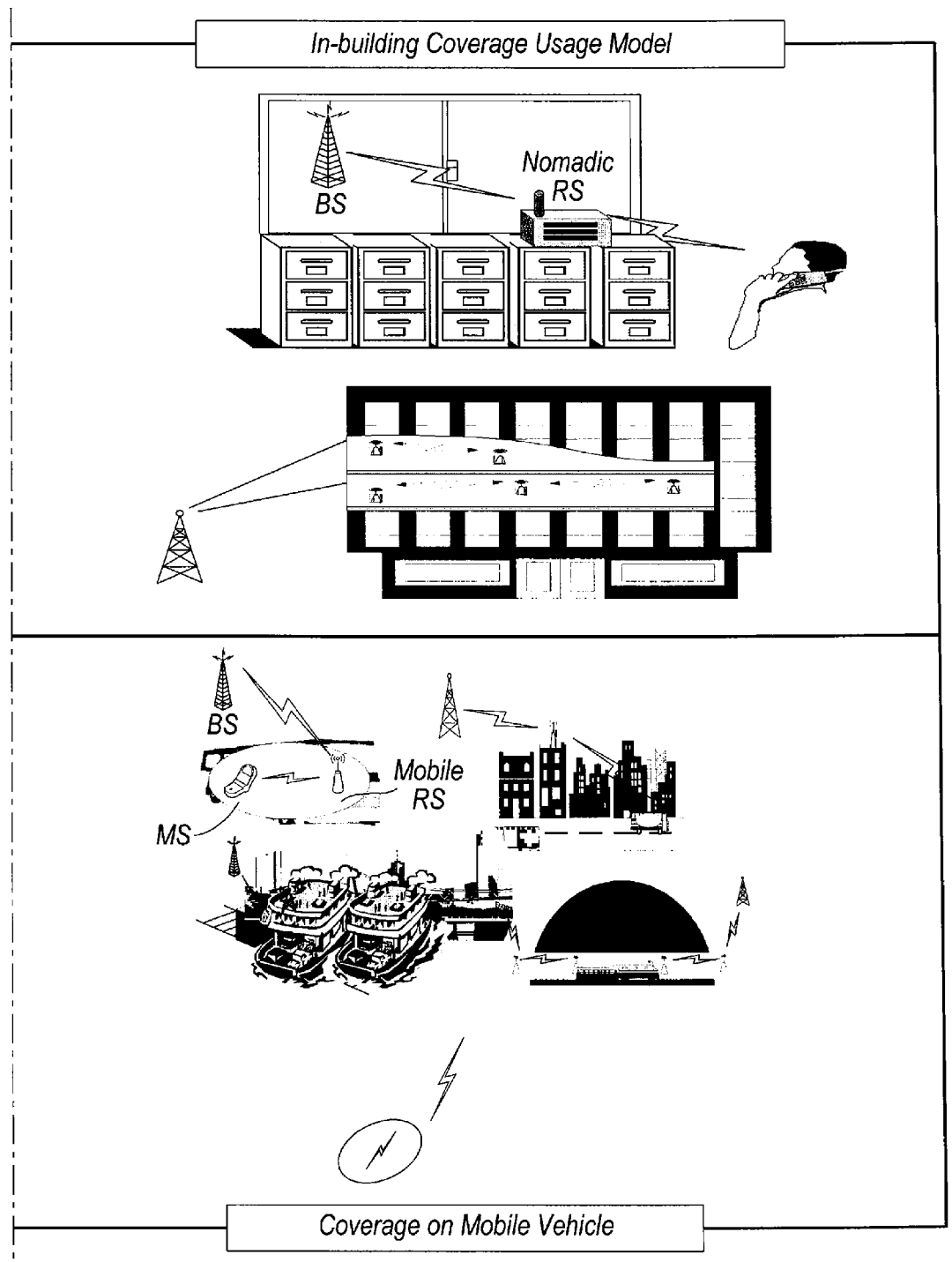
Figure 5:
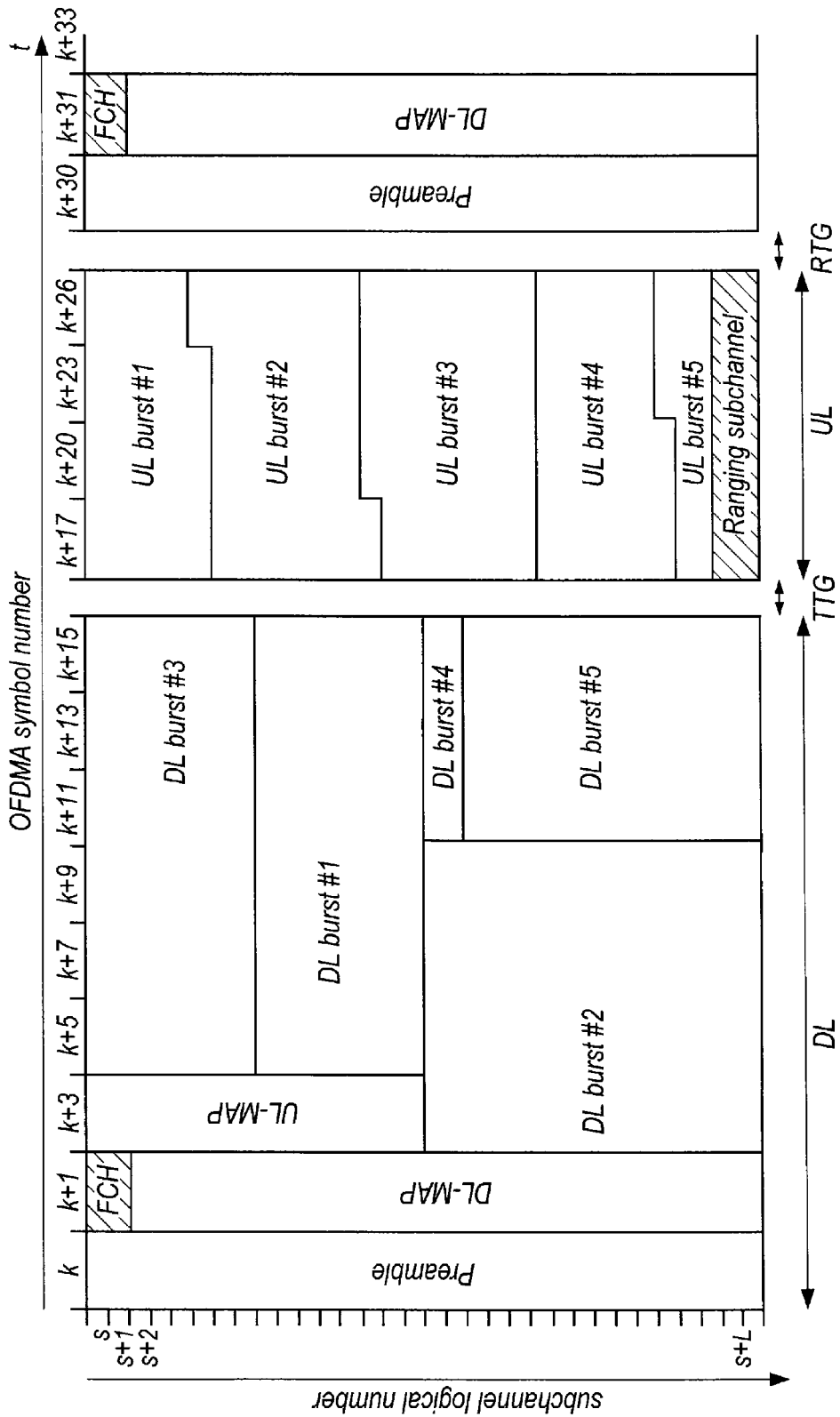
FIG. 5 shows a TDD frame structure used in OFDMA.

FIG. 2 illustrates the operation of the BS, RS and MS in terms of its activity within each of the zones described in Table 1. Whilst FIG. 2 only illustrates the case of a BS-RS1-RS2-RS3-MS link (i.e. a four hop link), it is possible to use the frame structure to support any number of hops. As shown for the case of RS3, the generalisation is that last relay in the hop (RSn) is not required to transmit the RP or RSn to RSn+1 zones in the DL sub-frame or receive the RSn+1 to RSn in the uplink. Due to the fact that the RS transmits the MAP information after reception of control information from the previous transmitter (i.e. BS or RS), two hop relaying will always incur at least an extra frame latency.

However, due to the fact it is possible to relay control information within a frame from RS to RS, if more than two-hop relaying is undertaken then the proposed frame structure keeps the relaying induced latency to a minimum, where the latency is given by:

$$L_{relay}(\text{frames}) = \text{floor}(N_{hops}/2) \quad (1)$$

In order to enable implementation, the frame structure may also need to incorporate some gap times to allow a node to turn around (i.e. change from transmitting to receiving mode, or vice versa). In this case, some of the zones may also incorporate a gap region or a gap zone maybe inserted in between two adjacent zones that require the change in operation mode of the node.

It is further preferably that in such a case that a BS is transmitting information to the RS in the MAP zone that it schedules transmission to the RS first, before transmission to any MS. The BS could then indicate in the MAP zone when there is no more information pending for the RS so that it can stop receiving whilst the BS transmits MAP information to other receivers and use this time as an opportunity for turn around.

In summary, the benefits of particular embodiments may include:
- Enable the construction of relays that incorporate some degree of local management of medium access
- Maximize spectral efficiency by making sure that the BS does not have any time in the frame when it is idle
- Minimal latency: two or three-hop relaying incurs 1 frame latency; 4 or 5 hop relaying incurs a 2 frame latency, 6 or 7 hop relaying incurs a 3 frame latency, etc.
- Enable the relaying enabled system to provide support to a legacy single-hop TDD user
- The possibility to further improve spectral efficiency through using SDMA based techniques to enable the same transmission resource (frequency & time) to be used between the BS and the RSs and MSs within a cell.
- Are extendable to any number of hops
- Define a special synchronization interval to enable synchronization of the relay with other relays or base stations
- Enable an RS to transmit a standard preamble or synchronization sequence (similar to that transmitted by a BS) that a legacy (non-relay aware) user can decode.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A transmission method for use in a multi-hop wireless communication system, the system comprising a source apparatus, a destination apparatus and one or more intermediate apparatuses, the transmission method comprising:
   in a first transmission window, transmitting data and/or control information for the destination apparatus from the source apparatus to a subsequent intermediate apparatus on a transmission path between the source apparatus and the destination apparatus;
   receiving the data and/or control information for the destination apparatus from a previous apparatus in the first transmission window, where the previous apparatus is the source apparatus or a previous intermediate apparatus on the transmission path;
   transmitting the received data and/or the received control information for the destination apparatus to a subsequent apparatus in a second transmission window, where the subsequent apparatus is the destination apparatus or a subsequent intermediate apparatus on the transmission path; and
   in the second transmission window, receiving the data and/or control information for the destination apparatus from a previous intermediate apparatus on the transmission path to the destination apparatus;
   wherein:
       a time-frequency format is used for transmission in the system, with a plurality of transmission windows being included within a transmission period, each window occupying a different part of the transmission period, each said window being assignable for transmission; and
       the first transmission window and the second transmission window are included within a same transmission period corresponding to a downlink subframe or an uplink subframe.

2. The transmission method according to claim 1, wherein a frequency bandwidth of said transmission windows encompass a common part of available transmission frequency bandwidth.

3. The transmission method according to claim 1, wherein a frequency bandwidth of said transmission windows extend over substantially the entire transmission frequency bandwidth for respective parts.

4. The transmission method according to claim 1, further comprising:
   prior to transmission of said data and/or control information, assigning a particular transmission window of a particular transmission period to a first intermediate apparatus along said consecutive links, for transmission of data and/or control information to a second intermediate apparatus along said consecutive links, said second intermediate apparatus being a subsequent apparatus along the path from the first intermediate apparatus, and assigning a subsequent transmission window of the particular transmission period to the second intermediate apparatus for transmission of data and/or control information to a third intermediate apparatus along said consecutive links, said third intermediate apparatus being a subsequent apparatus along the path from the second intermediate apparatus.

5. The transmission method according to claim 4, wherein said system comprises at least two intermediate apparatuses, and wherein said particular transmission period is a first transmission period, the method further comprising:
   prior to transmission of said data and/or control information, assigning a particular transmission window of a second transmission period subsequent to said first transmission period to said third intermediate apparatus for transmission of the data and/or control information to a fourth intermediate apparatus along said consecutive links, said fourth intermediate apparatus being a subsequent apparatus along the path from the third intermediate apparatus.

6. The transmission method according to claim 4, wherein the system comprises at least three intermediate apparatuses, the method further comprising:
   prior to transmission of said data and/or control information, assigning a subsequent transmission window of the second transmission period to the fourth intermediate apparatus for transmission of the data and/or control information to a fifth intermediate apparatus along said consecutive links, said fifth intermediate apparatus being a subsequent apparatus along the path from the fourth intermediate apparatus.

7. The transmission method according to claim 4, wherein said particular and subsequent transmission windows of each of said first and/or second transmission periods are either side in time of a further transmission window of the transmission period concerned.

8. The transmission method according to claim 7, further comprising:
performing processing in said second and/or fourth intermediate apparatus during the part of the particular transmission period corresponding to the further transmission window of the transmission period concerned, so as to configure the information for transmission in the subsequent transmission window of that transmission period based upon the information received in the particular transmission window of that transmission period.

9. The transmission method according to claim 4, wherein the or each particular or subsequent transmission window comprises two component transmission windows, one of those component transmission windows being for transmission of the control information and the other one of those component transmission windows being for transmission of the data information.

10. The transmission method according to claim 1, wherein said communication path is an indirect communication path, and wherein the system comprises at least a further destination apparatus, and wherein said source apparatus or any said intermediate apparatus is operable to transmit information directly to the or each further destination apparatus along a corresponding single link forming a direct communication path.

11. The transmission method according to claim 1, comprising employing a space division multiple access technique in one or more of said transmission windows of said transmission period.

12. The transmission method according to claim 1, wherein the time-frequency format is a format for a downlink or uplink sub-frame in a time-division-duplex communication system.

13. The transmission method according to claim 1, wherein said system is an OFDM or OFDMA system, and wherein the time-frequency format is a format for an OFDM or OFDMA downlink or uplink sub-frame of an OFDM or OFDMA time-division-duplex frame.

14. The transmission method according to claim 1, wherein said transmission period is a sub-frame period.

15. The transmission method according to claim 1, wherein each said transmission window comprises a region in an OFDM or OFDMA frame structure.

16. The transmission method according to claim 1, wherein each said transmission window comprises a zone in an OFDM or OFDMA frame structure.

17. The transmission method according to claim 1, wherein said source apparatus is a base station.

18. The transmission method according to claim 1, wherein said source apparatus is a user terminal.

19. The transmission method according to claim 1, wherein said destination apparatus is a base station.

20. The transmission method according to claim 1, wherein said destination apparatus is a user terminal.

21. The transmission method according to claim 1, wherein each of said one or more intermediate apparatuses is a relay station.

22. A multi-hop wireless communication system, the system comprising:
a source apparatus, a destination apparatus and one or more intermediate apparatuses, said source apparatus being operable to transmit information along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path;
the system using a time-frequency format for transmission in the system, with a plurality of transmission windows being included within a transmission period, each window occupying a different part of the transmission period, each said window being assignable for transmission, wherein the plurality of transmission windows comprise a first transmission window and a second transmission window included within the same transmission period corresponding to a downlink subframe or an uplink subframe; and comprising
first transmission means operable to transmit data and/or control information in the first transmission window for the destination apparatus from the source apparatus to a subsequent intermediate apparatus on a transmission path between the source apparatus and the destination apparatus;
first receiving means operable to receive the data and/or control information for the destination apparatus from a previous apparatus in the first transmission window, where the previous apparatus is the source apparatus or a previous intermediate apparatus on the transmission path;
second transmission means operable to transmit the received data and/or the received control information for the destination apparatus to a subsequent apparatus in a second transmission window, where the subsequent apparatus is the destination apparatus or a subsequent intermediate apparatus on the transmission path; and
second receiving means operable to receive in the second transmission window the data and/or control information for the destination apparatus from a previous intermediate apparatus on the transmission path to the destination apparatus.

23. A suite of computer programs which, when executed on computing devices of a multi-hop wireless communication system, causes the system to carry out a transmission method, the system comprising a source apparatus, a destination apparatus and one or more intermediate apparatuses, the transmission method comprising:
in a first transmission window, transmitting data and/or control information for the destination apparatus from the source apparatus to a subsequent intermediate apparatus on a transmission path between the source apparatus and the destination apparatus;
receiving the data and/or control information for the destination apparatus from a previous apparatus in the first transmission window, where the previous apparatus is the source apparatus or a previous intermediate apparatus on the transmission path;
transmitting the received data and/or the received control information for the destination apparatus to a subsequent apparatus in a second transmission window, where the subsequent apparatus is the destination apparatus or a subsequent intermediate apparatus on the transmission path; and
in the second transmission window, receiving the data and/or control information for the destination apparatus from a previous intermediate apparatus on the transmission path to the destination apparatus;

wherein:
a time-frequency format is used for transmission in the system, with a plurality of transmission windows being included within a transmission period, each window occupying a different part of the transmission period, each said window being assignable for transmission; and the first transmission window and the second transmission window are included within a same transmission period corresponding to a downlink subframe or an uplink subframe.

24. An intermediate apparatus for use in a multi-hop wireless communication system, the system further comprising a source apparatus, and a destination apparatus, the intermediate apparatus comprising:

A processor;

a reception unit to receive data and/or control information for the destination apparatus from a previous apparatus in a first transmission window, the previous apparatus is the source apparatus or a previous intermediate apparatus on a transmission path; and a transmission unit to transmit the received data and/or the received control information for the destination apparatus to a subsequent apparatus in a second transmission window, the subsequent apparatus is the destination apparatus or a subsequent intermediate apparatus on the transmission path;

wherein a time-frequency format is used for transmission in the system, with a plurality of transmission windows being included within a transmission period, each window occupying a different part of the transmission period, each said window being assignable for transmission; and the first transmission window and the second transmission window are included within a same transmission period corresponding to a downlink subframe or an uplink subframe.

25. A method for use in an intermediate apparatus of a multi-hop wireless communication system, the system further comprising a source apparatus, and a destination apparatus, said source apparatus being operable to transmit information along a series of links forming a communication path extending from the source apparatus to the destination apparatus via the intermediate apparatus, and the intermediate apparatus being operable to receive information from a previous apparatus along the path, the system using a time-frequency format for transmission in the system, a plurality of transmission windows being included within a transmission period, each window occupying a different part of the transmission period, each said window being assignable for transmission; and to transmit the received information to a subsequent apparatus along the path, the method comprising:

receiving data and/or control information for the destination apparatus from a previous apparatus in a first transmission window, the previous apparatus is the source apparatus or a previous intermediate apparatus on a transmission path; and transmitting the received data and/or the received control information for the destination apparatus to a subsequent apparatus in a second transmission window, the subsequent apparatus is the destination apparatus or a subsequent intermediate apparatus on the transmission path;

wherein a time-frequency format is used for transmission in the system, with a plurality of transmission windows being included within a transmission period, each window occupying a different part of the transmission period, each said window being assignable for transmission; and the first transmission window and the second transmission window are included within a same transmission period corresponding to a downlink subframe or an uplink subframe.

26. A non-transitory computer readable medium embedded in a computer program which, when executed on a computing device of an intermediate apparatus in a multi-hop wireless communication system, causes the intermediate apparatus to carry out a transmission method, the system further comprising a source apparatus, and a destination apparatus, said source apparatus being operable to transmit information along a series of links forming a communication path extending from the source apparatus to the destination apparatus via the intermediate apparatus, and the intermediate apparatus being operable to receive information from a previous apparatus along the path and to transmit the received information to a subsequent apparatus along the path, the system using a time-frequency format for transmission in the system, a plurality of transmission windows being included within a transmission period, each window occupying a different part of the transmission period, each said window being assignable for transmission; the method comprising:

receiving data and/or control information for the destination apparatus from a previous apparatus in a first transmission window, the previous apparatus is the source apparatus or a previous intermediate apparatus on a transmission path; and transmitting the received data and/or the received control information for the destination apparatus to a subsequent apparatus in a second transmission window, the subsequent apparatus is the destination apparatus or a subsequent intermediate apparatus on the transmission path;

wherein a time-frequency format is used for transmission in the system, with a plurality of transmission windows being included within a transmission period, each window occupying a different part of the transmission period, each said window being assignable for transmission; and the first transmission window and the second transmission window are included within a same transmission period corresponding to a downlink subframe or an uplink subframe.

* * * * *